US010894339B2

(12) United States Patent
Ruffner (10) Patent No.: US 10,894,339 B2
(45) Date of Patent: *Jan. 19, 2021

(54) ELECTRIC CONCRETE SAW (71) Applicant: Diamond Products, Limited, Elyria, OH (US)

(72) Inventor: Thomas G. Ruffner, Oberlin, OH (US)

(73) Assignee: Diamond Products, Limited, Elyria, OH (US)

( * ) Notice: Subject to any disclaimer, the term of this patent is extended or adjusted under 35 U.S.C. 154(b) by 324 days.

This patent is subject to a terminal disclaimer.

(21) Appl. No.: 15/840,989

(22) Filed: Dec. 13, 2017

(65) Prior Publication Data

US 2018/0099432 A1    Apr. 12, 2018

Related U.S. Application Data (63) Continuation of application No. 14/559,260, filed on Jan. 16, 2015, now Pat. No. 9,873,210.

(60) Provisional application No. 61/929,023, filed on Jan. 18, 2014.

(51) Int. Cl.
*B28D 1/04*    (2006.01)
*B27B 5/10*    (2006.01)
*E01C 23/09*    (2006.01)
*B23D 47/12*    (2006.01)

(52) U.S. Cl.
CPC ............. *B28D 1/045* (2013.01); *B23D 47/12* (2013.01); *B27B 5/10* (2013.01); *E01C 23/0933* (2013.01)

(58) Field of Classification Search
None
See application file for complete search history.

(56) References Cited

U.S. PATENT DOCUMENTS

| 2,366,646 A |   | 1/1945 | Orr |
| 4,664,645 A |   | 5/1987 | Muck et al. |
| 4,998,775 A | * | 3/1991 | Hollifield ............. B23D 59/002 |
|   |   |   | 125/14 |
| 5,104,195 A |   | 4/1992 | Zaccho |
| 5,429,420 A | * | 7/1995 | Johnson ................. B23D 47/12 |
|   |   |   | 299/39.3 |
| 5,558,476 A |   | 9/1996 | Uchida et al. |
| 5,579,753 A |   | 12/1996 | Chiuminatta et al. |

(Continued)

FOREIGN PATENT DOCUMENTS

CN    202969384 U    6/2013
WO    2010114545 A1    10/2010

OTHER PUBLICATIONS

Briggs & Stratton Operator's Manual for Models 540000 and 610000, Copyright 2010 Briggs & Stratton Corporation, Milwaukee, WI, nine pages.

(Continued)

*Primary Examiner* — Brian D Keller
(74) *Attorney, Agent, or Firm* — Rankin, Hill & Clark LLP (57) ABSTRACT A self-propelled electric concrete saw having at least two electric motors. A first electric motor of the concrete saw is powered by an external power supply and can power both a saw blade and a drive system. A second electric motor of the concrete saw is powered by a rechargeable battery and can power the drive system. The concrete saw can be maneuvered by using the second electric motor with or without the concrete saw being connected to the external power supply.

23 Claims, 10 Drawing Sheets

(56) References Cited

U.S. PATENT DOCUMENTS

| | | | |
|---|---|---|---|
| 5,724,956 | A | 3/1998 | Ketterhagen |
| 5,809,985 | A | 9/1998 | Kingsley et al. |
| 5,823,703 | A | 10/1998 | Thomas et al. |
| 5,921,228 | A * | 7/1999 | Watson ............... B28D 1/043 125/13.01 |
| 6,170,478 | B1 | 1/2001 | Gorder |
| 6,318,353 | B1 | 11/2001 | Edwards et al. |
| 6,470,874 | B1 | 10/2002 | Mertes |
| 6,895,835 | B2 | 5/2005 | Cordeiro |
| 7,117,864 | B2 | 10/2006 | Marques et al. |
| 7,434,889 | B2 | 10/2008 | Moller et al. |
| 7,712,182 | B2 | 5/2010 | Zeiler |
| 7,942,142 | B2 | 5/2011 | Gobright, IV |
| 8,342,610 | B2 | 1/2013 | Marsic et al. |
| 8,347,872 | B2 | 1/2013 | Gobright, IV |
| 8,360,045 | B2 | 1/2013 | Marsic et al. |
| 2007/0191179 | A1 | 8/2007 | Hugenroth et al. |
| 2008/0150347 | A1 | 6/2008 | Moller et al. |
| 2008/0260461 | A1 | 10/2008 | Berning et al. |
| 2009/0183722 | A1 | 7/2009 | Marques et al. |
| 2010/0043767 | A1 | 2/2010 | Marsic et al. |
| 2012/0068525 | A1 | 3/2012 | Moller |
| 2013/0247897 | A1 | 9/2013 | Ruffner |

OTHER PUBLICATIONS

International Search Report filed in PCT/US2015/011840 dated May 11, 2015.
European Search Report of EP 15 73 7822 dated Aug. 4, 2017.

* cited by examiner

ELECTRIC CONCRETE SAW

FIELD

This application is a continuation application of pending application Ser. No. 14/599,260 that was filed on Jan. 16, 2015, which claims priority in provisional patent application Ser. No. 61/929,023 that was filed on Jan. 18, 2014, both of which are incorporated by reference herein.

The present subject matter relates to self-propelled electric concrete saws.

INCORPORATION BY REFERENCE

U.S. Pat. No. 7,942,142 to Gobright, IV discloses a battery powered concrete saw and is incorporated by reference for showing the same. U.S. Pat. No. 8,347,872 to Gobright, IV also discloses a battery powered concrete saw and is also incorporated by reference for showing the same. U.S. Pat. No. 6,318,353 to Edward et al. discloses a concrete saw with multispeed drive and is incorporated by reference for showing the same. U.S. Pat. No. 5,724,956 to Ketterhagen, IV discloses a riding saw for cutting concrete and is incorporated by reference for showing the same. U.S. Pat. No. 6,470,874 to Mertes discloses a high product, riding, concrete saw and is incorporated by reference for showing the same. U.S. Pat. No. 7,117,864 to Marques et al. discloses a mobile road or floor saw and is incorporated by reference for showing the same. U.S. Pat. No. 7,434,889 to Moller et al discloses a self-propelled concrete saw and is incorporated by reference for showing the same. U.S. Pat. No. 8,360,045 to Marsie et al discloses a concrete saw and is incorporated by reference for showing the same. Published patent application No. US 2012/0068525 to Moller discloses a concrete saw having multiple motors and is incorporated by reference for showing the same.

BACKGROUND

In the concrete industry, when building bridges, buildings, roads and the like, it is often necessary to pour large horizontal slabs of concrete. Once poured, it is usually necessary to machine the slab. Such machining may include cutting seams completely through the slab to form expansion joints and to allow for foundation shifting, cutting notches partially into the slab at predetermined locations at which stress cracks will form along the slab, cutting multiple grooves into the slab to create a high friction surface such as for bridges, grinding the surface of the slab and the like. While performing a cut, the operator controls the direction, cutting speed, cutting depth and the like. Concrete saws are also used in the demolition or removal of concrete, such as during the sawing and replacement of bridge decks. Various types of concrete saws may be utilized to carry out these machining and demolition tasks. In larger industrial applications, large self-propelled saws are used that are powered in a variety of manners, such as by gasoline, diesel, electric, propane and natural gas engines mounted on the saw. Concrete saws that are powered by an internal combustion engine, or that are electrically powered and include an internal combustion engine generator, cannot be used indoors due to the exhaust generated by the engine.

In conventional electric concrete saws used for indoor cutting of concrete, a single powerful electric motor is used for all electrical power requirements for these large and heavy saws. For example, a single electric motor supplies power for all aspects of the electric concrete saw, including for rotating the saw blade, for raising and lowering the saw blade, and for powering the wheels of the saw to assist in moving the concrete saw from one location to another. Such electric motors are large and powerful, often exceeding an output of 10 horse power (HP) and requiring 400 volts or more to operate. Such motors require an external power supply and cannot be plugged into a typical 120 volt outlet present in most residential structures. Such heavy duty motors used in concrete saws are often three-phase motors, which require a special connection to three-phase electric power supply typically provided to industrial and other non-residential buildings.

Three-phase power supplies are not always readily accessible for connection to the motor at all areas of a worksite. Therefore, before the electric motor is connected to an external three-phase electric power supply, the wheels of conventional electric concrete saws are not self-propelled. For example, before connection to a power supply, an operator must move the saw from a delivery location (e.g. from a truck, trailer, or other vehicle) to a cutting location (e.g. inside a building) without assistance from the electric motor. Movement of these large and heavy industrial electric concrete saws is difficult and laborious without assistance from the motor to propel the wheels. Often more than one operator is needed to maneuver the machine from one location to another. Further, connecting the saw to an external three-phase electric power supply to make the saw self-propelled, and to thereby assist in moving the saws, is often impractical or impossible in many locations.

SUMMARY

The difficulties and drawbacks associated with previously known electric concrete saws are overcome in the present electric saws and related combinations and methods.

The present subject matter provides an electric concrete saw having a first and second electric motor. The first electric motor can be connected to an external power supply and powers the saw blade, the drive system, and optionally the hydraulic system for lifting the saw blade away from a cutting surface. The second electric motor is connected to a battery, which is mounted on the saw. The second electric motor only powers the drive system and therefore requires much less power than the first electric motor. Preferably, a third electric motor is provided for the saw, and the third electric motor drives the hydraulic system for raising and lowering the saw and thus the depth of cut, and then in this configuration the first electric motor does not drive the hydraulic system for lifting the saw.

In accordance with one set of aspects, provided is an electric concrete saw comprises a generally rectangular frame having a front end, a rear end and a longitudinal length. A saw blade is rotatably mounted to the frame and configured to be driven. The frame has a pair of rear wheels and a pair of front wheels for facilitating movement of the saw. A drive system is mounted to the frame and configured to drive the rear wheels at a desired speed in a forward and a rearward direction. The drive system may include a transmission or gear mechanism and is operably connected to the pair of rear wheels for moving the saw forwards and backwards. A first electric motor is mounted to the frame and is configured to be operably connectable to an external power supply for receiving power therefrom. The first electric motor has a rotational output shaft operably connected to the saw blade for driving the saw blade and is operable connected to the drive system. A second electric motor is mounted to the frame and is operably connectable to a battery for receiving power therefrom. The second electric motor has a rotational output shaft operably connected to the drive system. The drive system has a decoupler or clutch adapted to selectively decouple one of the first electric motor and the second electric motor from the drive system. A controller is configured to control operation of the first electric motor and the second electric motor. The concrete saw is operable in a first mode where the pair of rear wheels is driven solely by the first electric motor. The concrete saw is operable in a second mode where the pair of rear wheels is driven solely by the second electric motor. Preferably, the controller is configured such that when the saw is connected to an external power supply for providing power to the first electric motor, the second electric motor is disabled so that it cannot power the drive system.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

The subject matter described herein provides an electric concrete saw that is configured for indoor cutting and which provides assistance to an operator in moving the saw without the need to connect the saw to an external power supply.

In greater detail, and with reference to the drawings, wherein like numerals refer to like parts throughout the several views, FIGS. 1-8 illustrate an electric concrete saw 10 for modifying a material M including, but not limited to, cutting seams, notches and/or grooves into or through asphalt, concrete, stone or other similar materials according to the present disclosure. Concrete saw 10 includes an implement or blade 20 (shown schematically in FIG. 1) configured for the modifying of material M. The saw further includes a first electric motor 30 and a second electric motor 40. First and second motors 30 and 40 are configured for selectively driving a drive system 50 depending on an operational mode of saw 10. Saw 10 has a frame 60 for supporting the first and second electric motors. Further, saw includes a front wheel assembly having a set of front wheels 70 and a rear wheel assembly having a set of rear wheels 80. Front and/or rear assembly can be adjustable to change the cutting depth of blade 20. The saw is preferably a self-propelled saw, and thus at least one drive wheel is driven in a manner described below. In a preferred set of embodiments, rear wheels 80 are driven, which will be discussed in greater detail below. However, it will be appreciated that saw 10 could also be a pushed without assistance from the self-propelled wheel(s).

Second electric motor 40 can be configured to also selectively drive the drive wheel, which in a preferred embodiment, is both rear wheels 80, and is mechanically coupled to drive system 50. A speed regulator can be coupled to second electric motor 40 so as to control the velocity of the output shaft of the second electric motor. Alternatively, the speed at which the drive wheel is driven can be controlled by a transmission. The speed regulator can also provide motor driving and control functions including starting and stopping control, torque regulation, phase control, voltage and current control. Second electric motor 40 is operably connected to one or more rechargeable batteries 100 and, as is well known, converts the electricity from battery 100 to mechanical power in the form of rotation of a second output shaft 41 of second electric motor 40. Rechargeable battery 100 is mounted relative to frame 60 in a suitable manner. Battery 100 can be a conventional lead acid battery, a nickel-cadmium battery, a nickel metal hydride battery, a lithium battery, or a combination of conventional batteries. For most applications, battery 100 preferably comprises a 12 volt lead acid battery. In use, second electric motor 40 receives electric power from battery 100. In an alternative embodiment, second motor 40 could receive power from an external source of power, such as an outlet. A controller 110 of saw 10 is in signal communication with first electric motor 30 and second electric motor 40 for controlling powering and speed of the motors. The controller is configured to monitor the status of the battery and when recharging is required the controller can actuate recharging of battery 100 from power supplied by an external power supply 120. For example, when saw 10 is connected to external power supply 120, such as a three-phase power supply of at least 300 volts, for powering first electric motor 30, controller 110 can with proper voltage control and rectification divert current from external power supply 120 to battery 100 so the battery can be recharged. In an alternative embodiment, second motor 40 could receive power from power supply 120, directly or by way of battery 100. In most cases the external power supply is a conventional 480 volt three-phase power source that is commonly found in the United States in commercial and other non-residential buildings.

Alternatively, battery 100 can be recharged by an external power source as further described below.

Specifically, it should be appreciated that that saw 10 can optionally include a charging system that supplies current to battery 100 to recharge the battery. According to one aspect, the charging system can be an independent plug-in charging system with a plug connection for connecting by a cord to a conventional 120 VAC wall plug of an external outlet. The plug-in charging system is further connected through a line to battery 100. The plug-in charging system may include a trickle charging mode for keeping the battery fresh when the saw is not in use. According to another aspect, the independent charging system can include a solar panel (not shown) mounted to saw 10 and electrically connected through a line to battery 100 and the solar panel could work in combination with the plug-in charging system. These charging systems can be used to keep the battery charged when, for example, saw 10 is placed in storage or is otherwise not in use.

Figure 1:
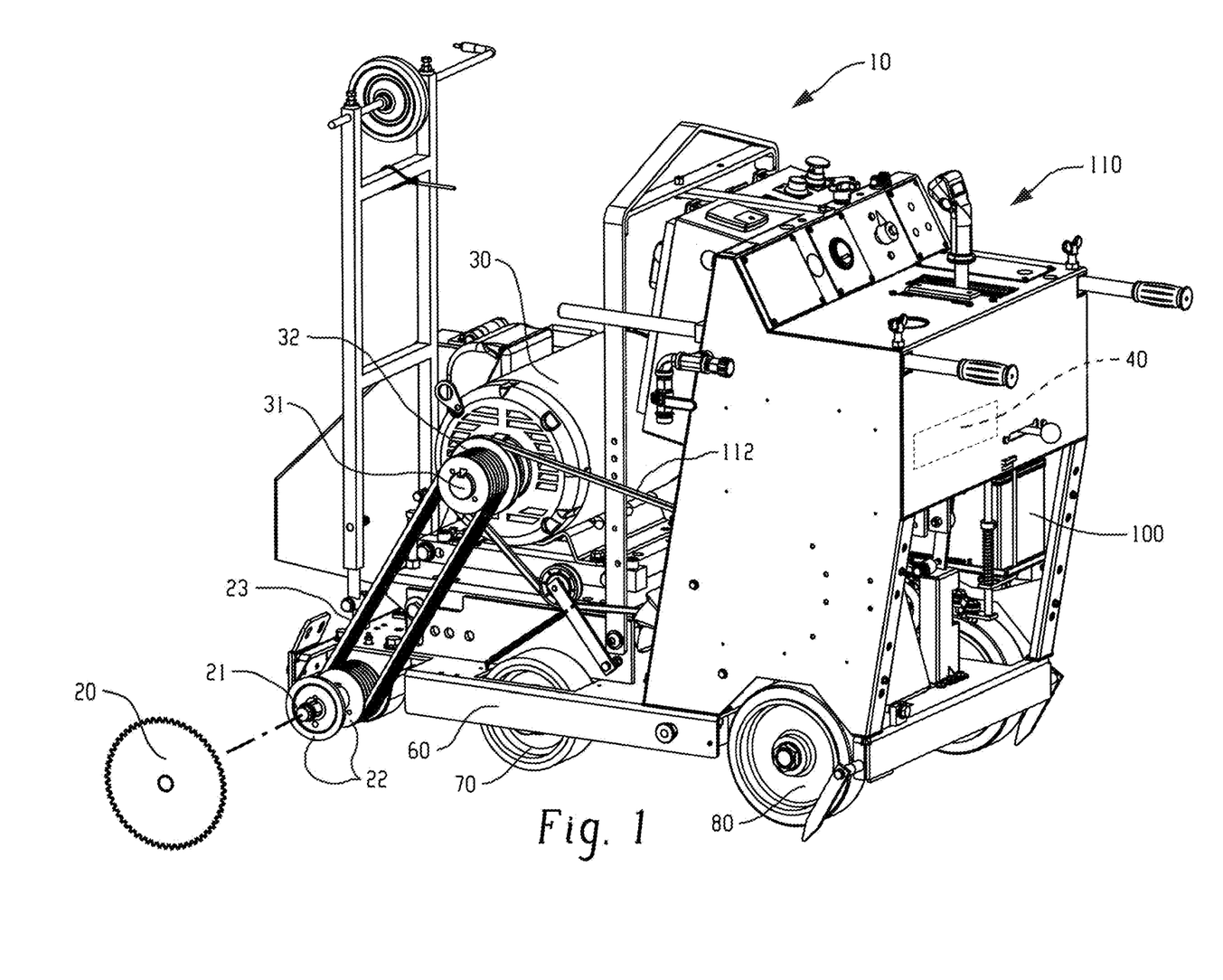
FIG. 1 is a side perspective view of an electric concrete saw in accordance with certain aspects of the present subject matter.
Figure 2:
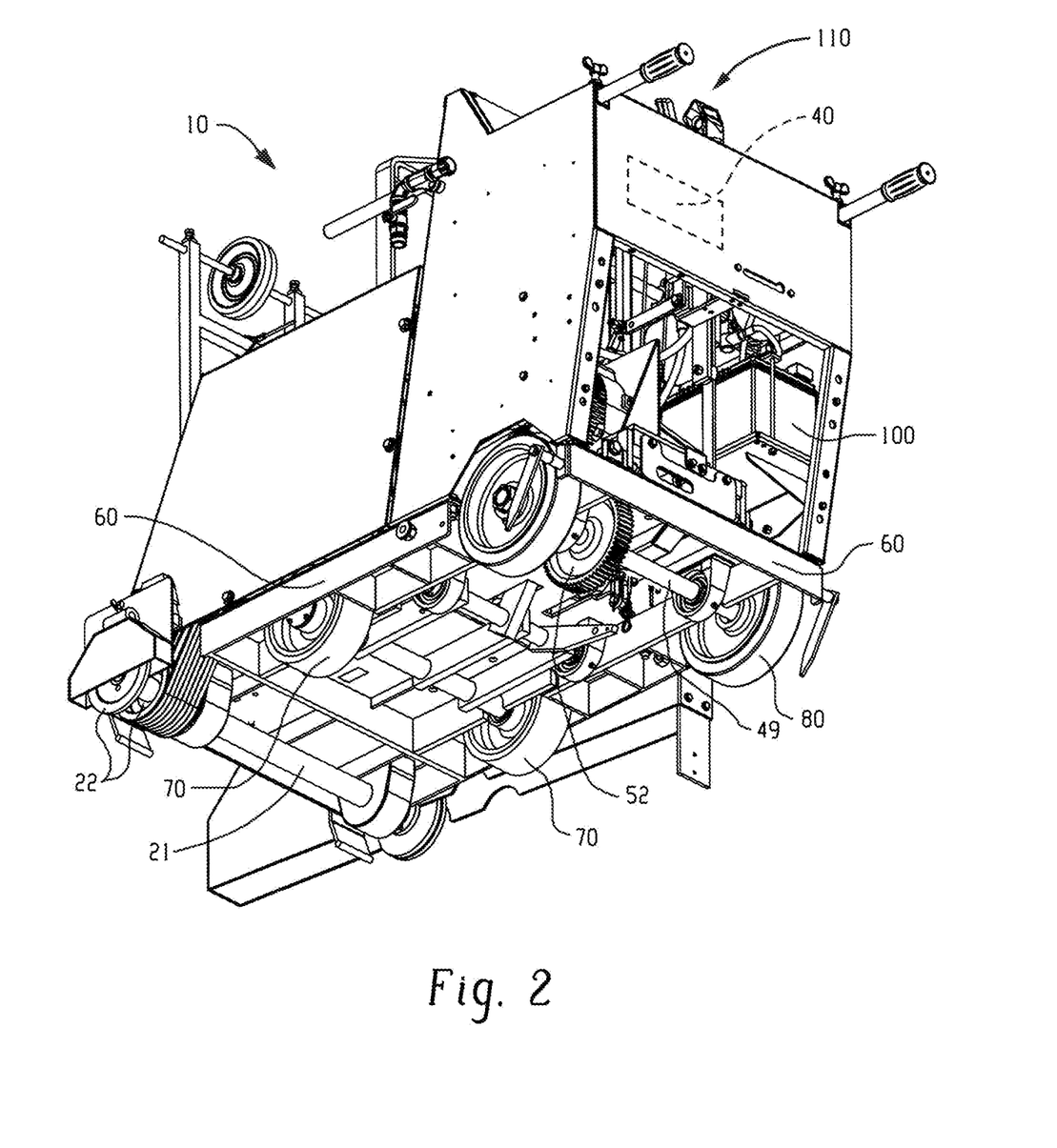
FIG. 2 is a bottom perspective view of the electric concrete saw shown in FIG. 1.
Figure 3:
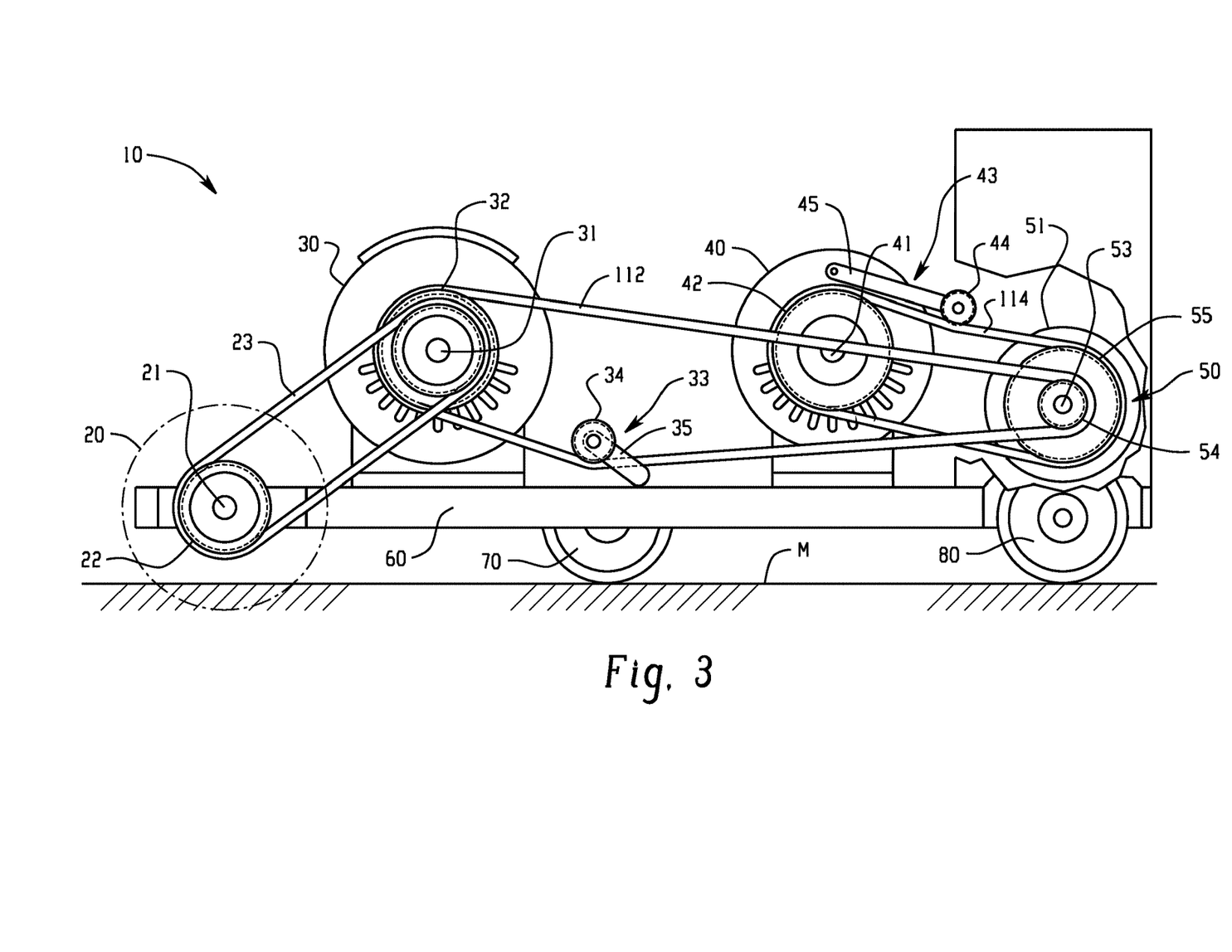
FIG. 3 is a side schematic view of portions of the electric concrete saw shown in FIG. 1.
Figure 4:
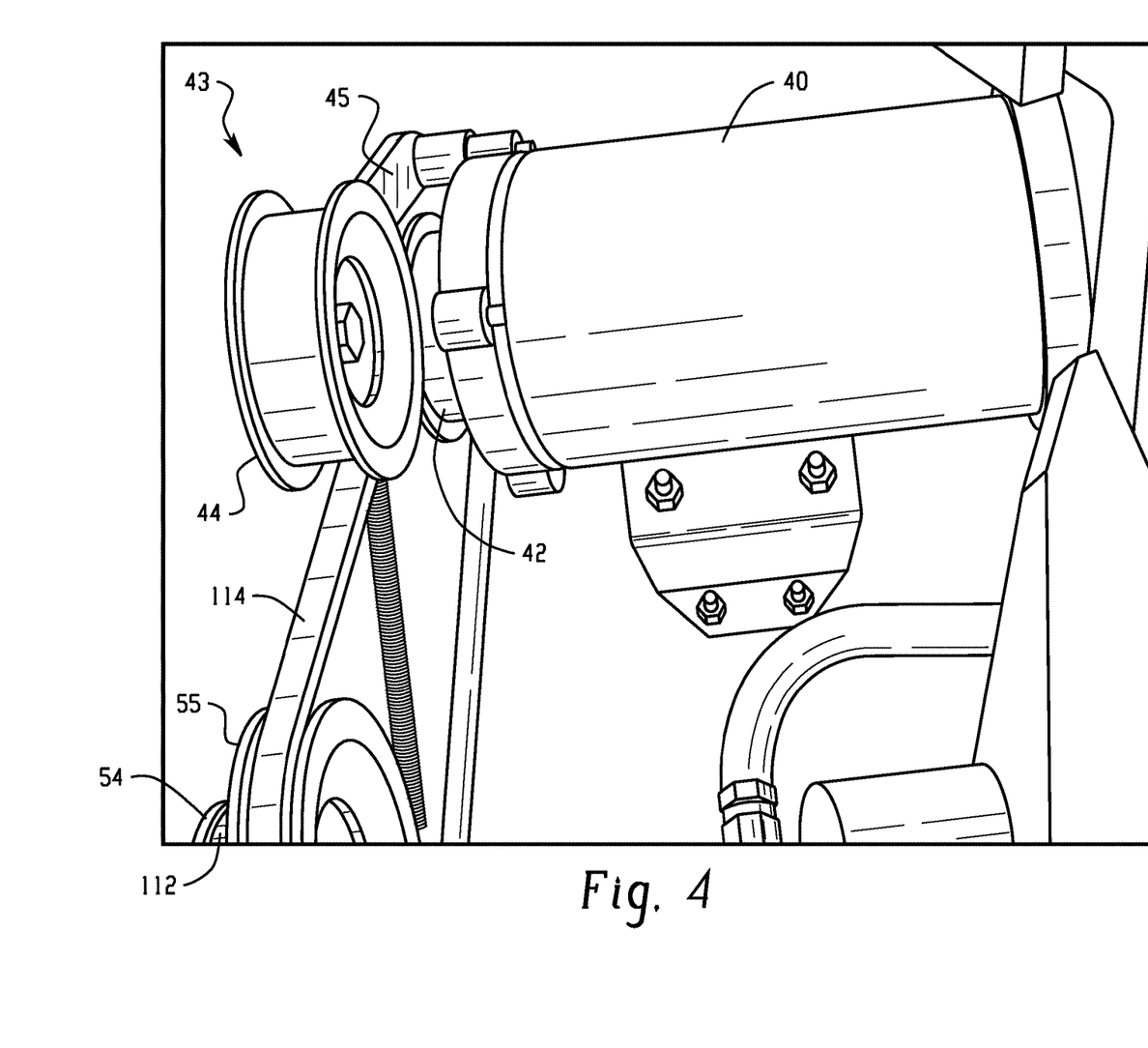
FIG. 4 is an enlarged perspective view of a second electric motor and tensioner assembly of an electric concrete saw in accordance with certain aspects of the present subject matter.
Figure 5:
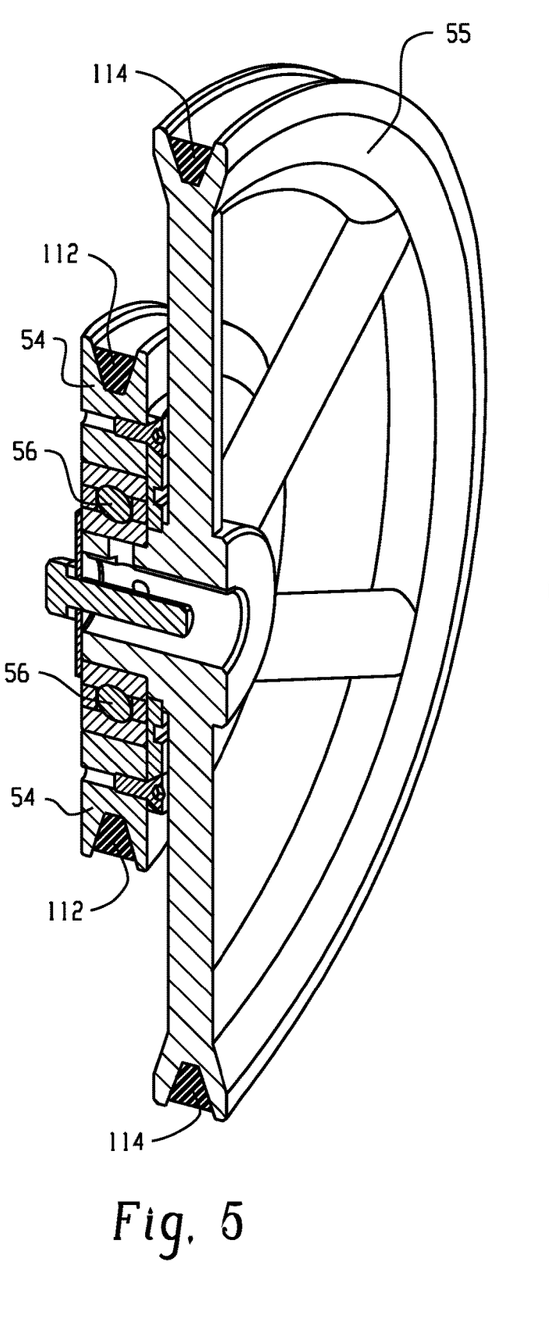
FIG. 5 is an enlarged perspective cut-away view of a first and a second sheave assembly in accordance with certain aspects of the present subject matter.
Figure 6:
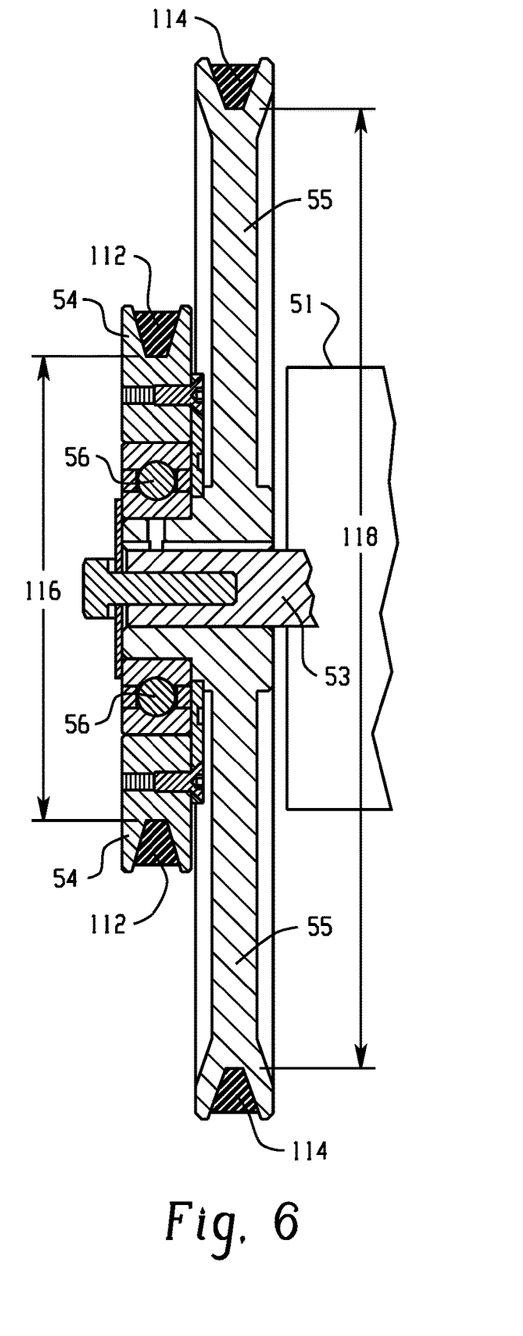
FIG. 6 is an inline view of the cross sectional view shown in FIG. 5.
Figure 7:
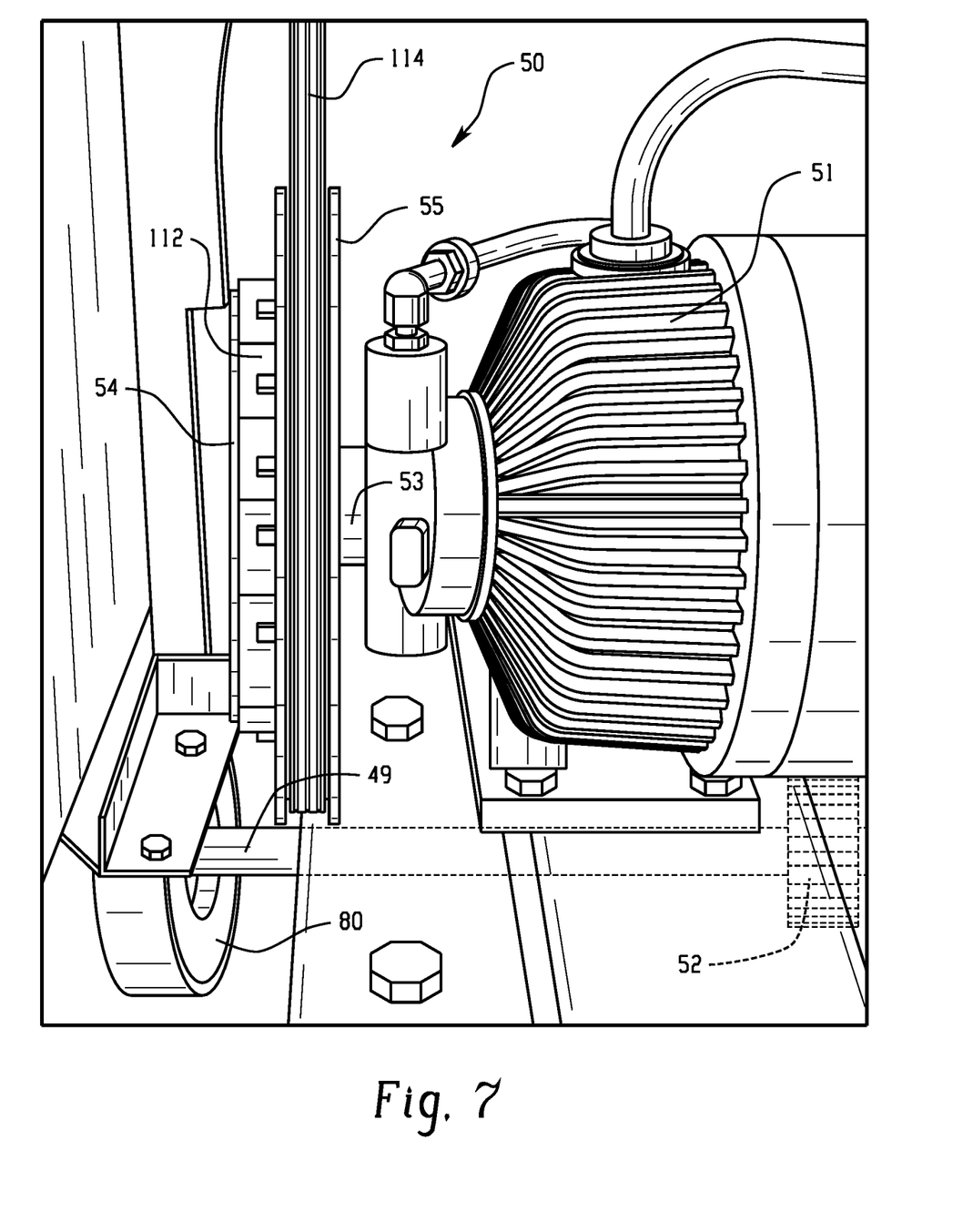
FIG. 7 is an enlarged perspective view of the first and second sheaves shown in FIGS. 5 and 6 along with a transmission for an electric concrete saw in accordance with certain aspects of the present subject matter.
Figure 8:
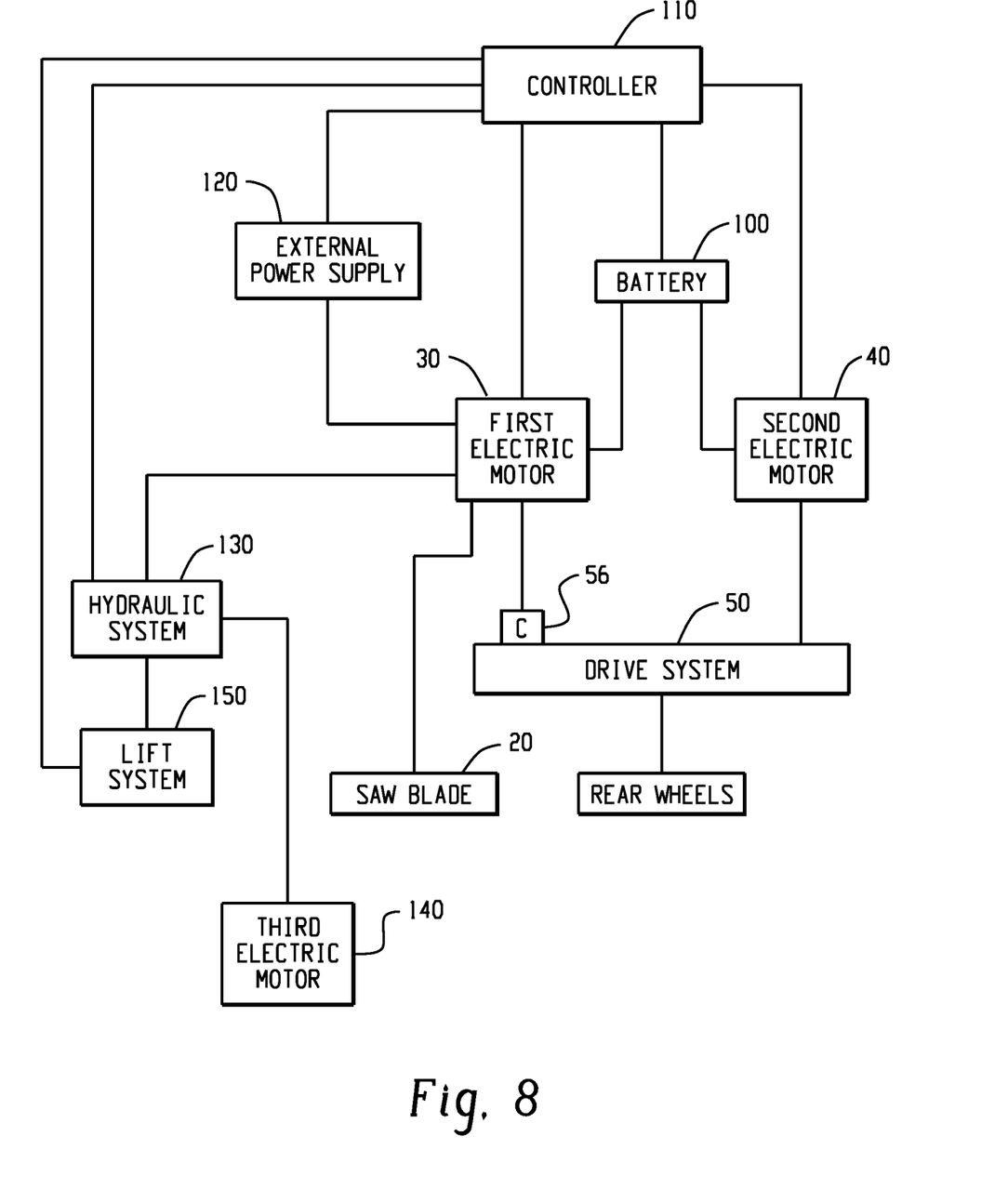
FIG. 8 is a schematic diagram of an operating system for operating an electric concrete saw in accordance with certain aspects of the present subject matter; and, FIGS. 9A-C are schematic wiring diagrams for an electric concrete saw in accordance with certain aspects of the present subject matter.

The operating system, schematically depicted in FIG. 8, for saw 10 preferably comprises a series operating modes. With these modes, saw 10 can operate such that only one of first electric motor 30 and second electric motor 40 drives drive system 50 at any given time. Thus, each of first electric motor 30 and second electric motor 40 can be effectively de-coupled from drive system 50 so that the other of first motor 30 and second motor 40 powers the drive system.

As schematically illustrated in FIG. 8, the operating system of saw 10 also includes operational systems such as a drive system 50 and a lift system 150 (primarily a hydraulic cylinder or ram for adjusting the cutting depth of implement or blade 20, which can include lifting the front of the saw). Drive system 50 preferably drives rear wheels 80 supporting saw frame 60 at a desired speed in a forward and/or rearward direction. Lift system 150 can tilt saw frame 60 to adjust the cutting or working depth of blade or implement 20. When adjusted, the saw blade may be taken out of contact with substrate or material M being modified or cut. Concrete saw 10 can include an engine mounting system that minimizes vibration within the frame. The saw can also include at least one speed selection lever for controlling the speed of advancement of the saw. Additionally, saw 10 can include a dampening mechanism that interrupts direct communication between first electric motor 30 and saw blade 20 when the blade encounters significant predetermined resistance.

First electric motor 30 and second electric motor 40 are preferably positioned in parallel relationship on frame 60 and are of a type generally known in the art. With this parallel relationship, each of first electric motor 30 and second electric motor 40 is oriented with its respective driven output shaft 31, 41 generally parallel to one another and perpendicular to an axis defined by the length of frame 60. This transverse arrangement aligns output shafts 31, 41 parallel to the rotational axis of an input shaft 53 of drive system 50, to afford an easy design for interconnecting pulleys/sheaves between first electric motor 30 and drive system 50, and between second electric motor 40 and drive system 50. First shaft 31 and second shaft 41 can have first and second pulleys 32, 42 respectfully attached thereto. While shaft connecting or mounting systems are shown for several components of this application, any output and/or input arrangement known in the art could be utilized for the components of this application.

Drive system 50 can a wide range of mechanisms known in the art, which includes, but is not limited to, a transmission 51, a gear mechanism 52, a drive shaft 49 and/or a combination thereof, for transmitting and controlling rotational energy from first electric motor 30 and/or second electric motor 40 to drive the driven wheel(s), such as drive wheel 80. In an exemplary embodiment, drive system 50 includes input shaft 53, which is oriented substantially parallel with output shafts 31, 41 and is for controlling and transmitting power to the driven wheel(s). As is shown, power is transmitted to rear wheels 80 of saw 10. A first sheave 54 and a second sheave 55 are operably connected to input shaft 53, wherein rotational output from one of the sheaves will rotate input shaft 53 and provide power to drive system 50. First sheave 54 is configured to be operably connected to first pulley 32 of first electric motor 30 by one or more V-belts 112, or other types of belts. Thereby, first electric motor 30 can drive input shaft 53 of drive system 50. Second sheave 55 is configured to be operably connected to second pulley 42 of second electric motor 40 by one or more V-belts 114, or other types of belts. Thereby, second electric motor 40 can also drive input shaft 53 of drive system 50.

In one embodiment, first sheave 54 is connected to input shaft 53 through a de-coupler 56 and second sheave 55 is connected to input shaft 53 whereby that rotation of second sheave 55 and rotation of input shaft 53 are integrally linked, such as by a direct connection for example. Through this arrangement, when second electric motor 40 is used to rotate second sheave 55 on input shaft 53 in order to drive the drive system and power rear wheels 80, first sheave 54 will remain in a stationary rotational orientation, so that all power from the second motor is transmitted to drive system 50. Further, when first electric motor 30 is used to rotate first sheave 54 on input shaft 53 in order to drive the drive system and power rear wheels 80, second sheave 55 remains stationary, and thus no power is lost in driving second electric motor 40.

In this configuration, second electric motor 40 can be relatively small, because it is used only to power drive system 50 and is not used to power the saw blade, the hydraulic system, or the lift system. In one embodiment, second electric motor 40 is a direct current motor rated from about ⅕ HP (horsepower) up to about 3 HP, and/or from about 12 volts to about 180 volts. In one embodiment, the second electric motor is 12 volt direct current motor rated at about 2 HP. Yet further, first sheave 54 has a first operating diameter 116 and second sheave 55 has a second operating diameter 118 that affect the overall gear ratio of the drive system. In one set of embodiments, second diameter 118 is larger than first diameter 116 to help allow for the differences between motor 30 and motor 40. In one set of embodiments, second diameter 118 is at least 50 percent larger than first diameter 116. In another set of embodiments, second diameter 118 is at least 75 percent larger than first diameter 116. In yet another set of embodiments, second diameter 118 is about twice as big as first diameter 116.

De-coupler 56 can be any de-coupling device known in the art. An example of a de-coupler is a clutch bearing for use in the present invention such as a clutch bearing sold by McMaster-Carr Supply Co. of Aurora, Ohio that is referenced to as a "High-Precision One-Way Locking Ball Bearing." It will be appreciated that in addition to the illustrated clutch bearing, other systems can be used to allow selective driving of the first and second electric motors. For example, de-coupler 56 can include on or more conventional frictional clutch assemblies. Further, gears and shafts could be used to selectively de-couple or isolate the first and/or second electric motors from the drive system. Yet further, while de-coupler 56 is shown within sheave 54, de-coupler could be within sheave 55 without detracting from the invention of this application.

First electric motor 30 when coupled to an external power supply is used to power drive system 50, optionally hydraulic lift system 130, and saw blade 20, and is therefore relatively large compared to second electric motor 40. In one embodiment, first electric motor 30 is a three-phase alternating current electric motor rated from about 20 HP to about 50 HP and/or greater than 300 volts. In another aspect the first electric motor is rated from about 300 volts to about 500 volts, and is preferably a 480 volt three phase AC motor intended to be coupled to a conventional 480 volt three phase building outlet. In a preferred embodiment as shown schematically in FIG. 8 saw 10 can include a third electric motor 140 for driving hydraulic system 130, and thus the first electric motor is then in not coupled to hydraulic system 130. The third electric motor is preferably a 12 volt direct current motor that is powered by battery 100.

Electric saw 10 also includes a blade shaft 21. The blade shaft or jack shaft 21 is oriented parallel to first shaft 31 of the first electric motor 30, connected to implement or saw blade 20, and supported by bearings mounted relative to frame 60. Blade shaft 21 includes at least one blade shaft pulley 22. First shaft 31 of first electric motor 30 is operatively connected to blade shaft 21 by one or more V-belts 23, or other type of belt, arranged to engage first pulley 32 to blade shaft pulley 22 for rotating the blade.

Again, drive system 50 can include transmission 51 and/or gear mechanism 52 for transmitting mechanical power from rotation of input shaft 53 to the drive wheel(s), which is shown to drive rear wheels 80 for powering the rear wheels as is well known. Preferably, transmission 51 comprises includes a hydraulic (hydrostatic) transmission available from sources such as Eaton and Sundstrand. It should also be appreciated that depicted transmission 51 is one example of a transmission for electric saw 10 and that alternative arrangements/configurations for the transmission of saw 10 are contemplated. For example, in lieu of or in combination with the belts, drive system 50 can be chain driven and can include a gear mechanism 52 to interconnect transmission 51 of drive system 50 to rear wheels 80 of electric saw 10.

As indicated above, drive system 50 can be selectively driven by first electric motor 30 and/or second electric motor 40 depending on the power supply used. To allow for the selective motor drive, drive system 50 includes at least one de-coupler 56 discussed above. De-coupler 56 is configured to selectively decouple one of the motors from drive system 50 depending on the operational mode of saw 10 (i.e., depending on whether first electric motor 30 or second electric motor 40 is driving rear wheels 80). In one set of embodiments, drive system 50 includes de-coupler or clutch bearing assembly 56 operably associated with first sheave 54, which is operably associated with first electric motor 30. For example, in a second electric motor only mode, de-coupler 56 decouples first output shaft 31 of first electric motor 30 from drive system 50, and in the first electric motor only mode, bearing 56 decouples second output shaft 41 of second electric motor 40 from drive system 50. Specifically, the clutch bearing only engages shaft 53 when sheave 54 is rotated in one direction, and it allows sheave 54 to remain stationary when sheave 55 is rotated in the same direction.

With reference back to FIG. 8, saw 10 includes a hydraulic system 130. Hydraulic system 130 is operatively connected to lift system 150 and is in signal communication with controller 110. Hydraulic power for lift system 150 is provided by hydraulic system 130, which is preferably powered by third electric motor 140. In that these systems are known in the art, further details are not provided in the interest of brevity. Controller 110 is provided on saw 10 for controlling first, second and third electric motors 30, 40 and 140, and the hydraulic flow of hydraulic system 130 used to power lift system 150. For example, third electric motor 140 can be used to power the hydraulic system and thus lift system 150 so that an operator can lift the front of saw 10 so that blade 20 can be lifted above and disengaged from a cutting surface.

Any of the belts of this application can include tensioning devices to maintain a desired belt tension. For example, motor 40 and belt 114 can include a tensioner assembly 43 that includes a tensioner pulley 44 and tensioner arm 45. Tensioner assemblies 43 provides for tension on the belt between second pulley 42 on second electric motor 40 and second sheave 55 on drive system 50. Similarly, motor 30 can include a tensioner assembly 33 that includes a tensioner pulley 34 and tensioner arm 35. Tensioner assemblies 33 provides for tension on the belt between first pulley 32 on first electric motor 30 and first sheave 54 on drive system 50.

Controller 110 can be mechanically and electrically connected to first electric motor 30 and second electric motor 40 associated with the driven wheel that is preferably the set of rear wheels 80 for controlling movement of saw 10.

Lift system 150 can operate as is known in the art. This system can include a hydraulic cylinder (not shown) having one end that is secured in a suitable manner to frame 60 and having another end that has a pivotal connection to front wheels 70. A hydraulic pump (not shown) has a fluid connection to the cylinder and is rotationally driven by first electric motor 30 which has a power connection to an external power supply 120. Controller 110 mechanically and/or electrically connected to, and is configured to control, the operation of first electric motor 30, third electric motor 140 and thus hydraulic system 130, and second electric motor 40.

Figure 9A:
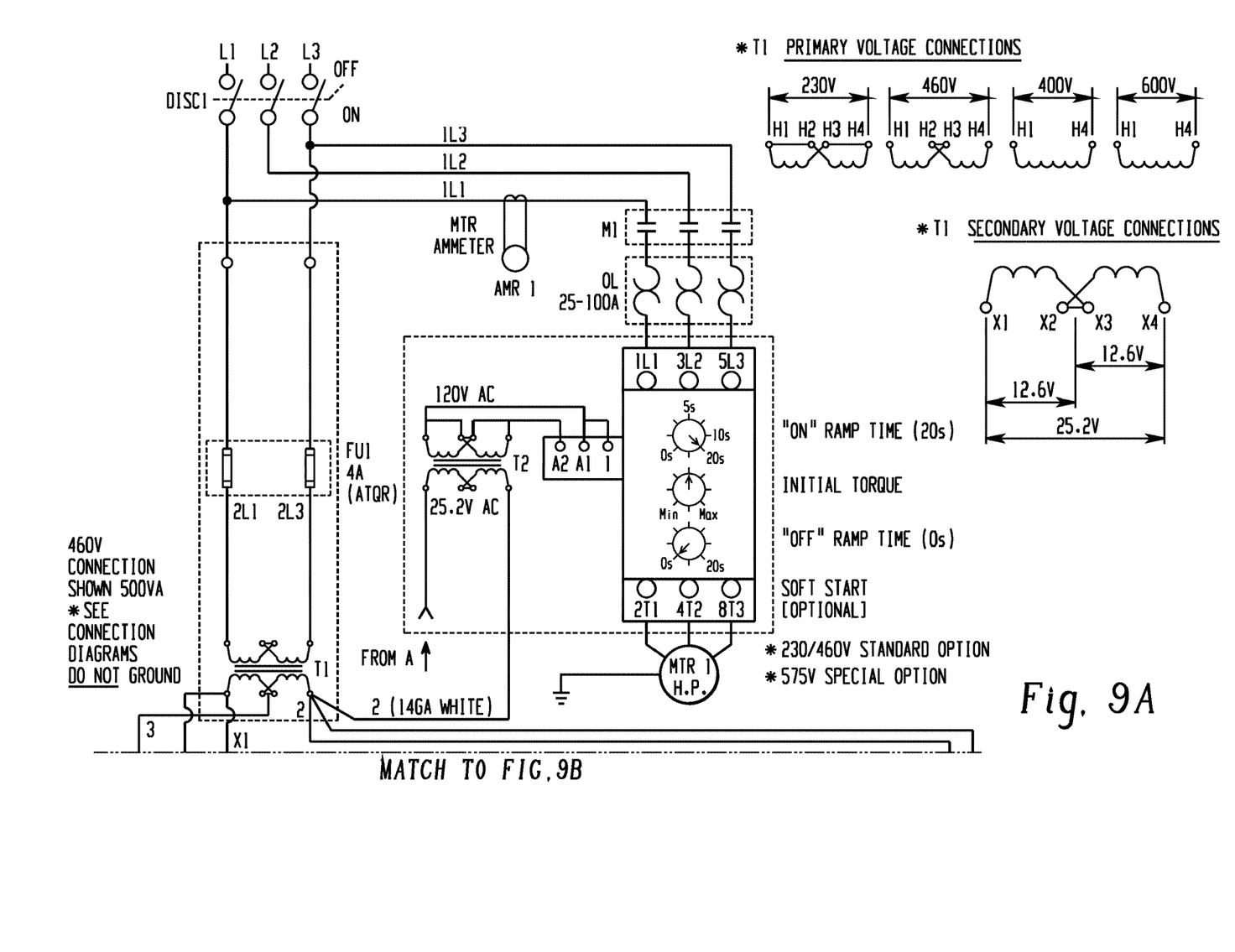
Figure 9B:
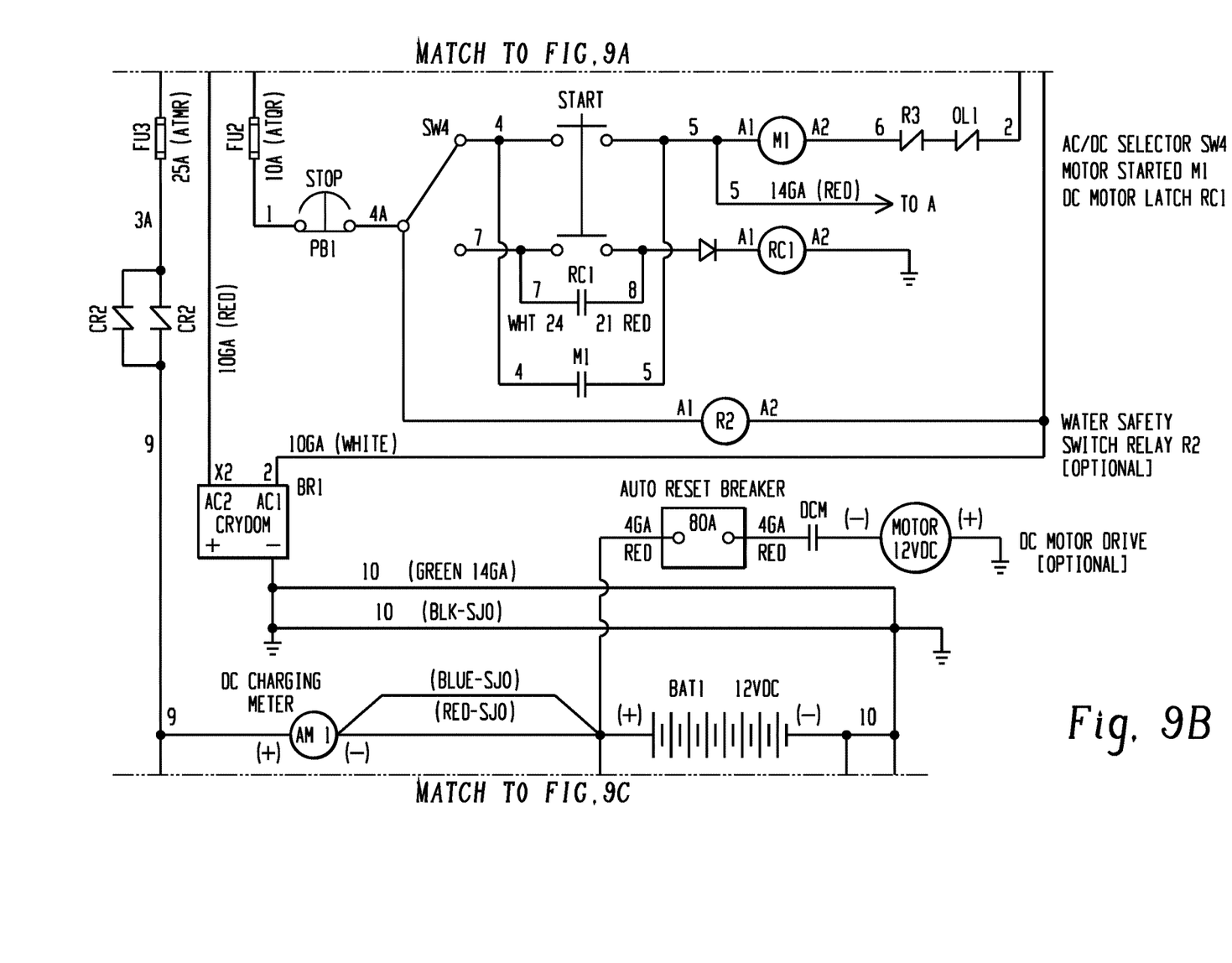
Figure 9C:
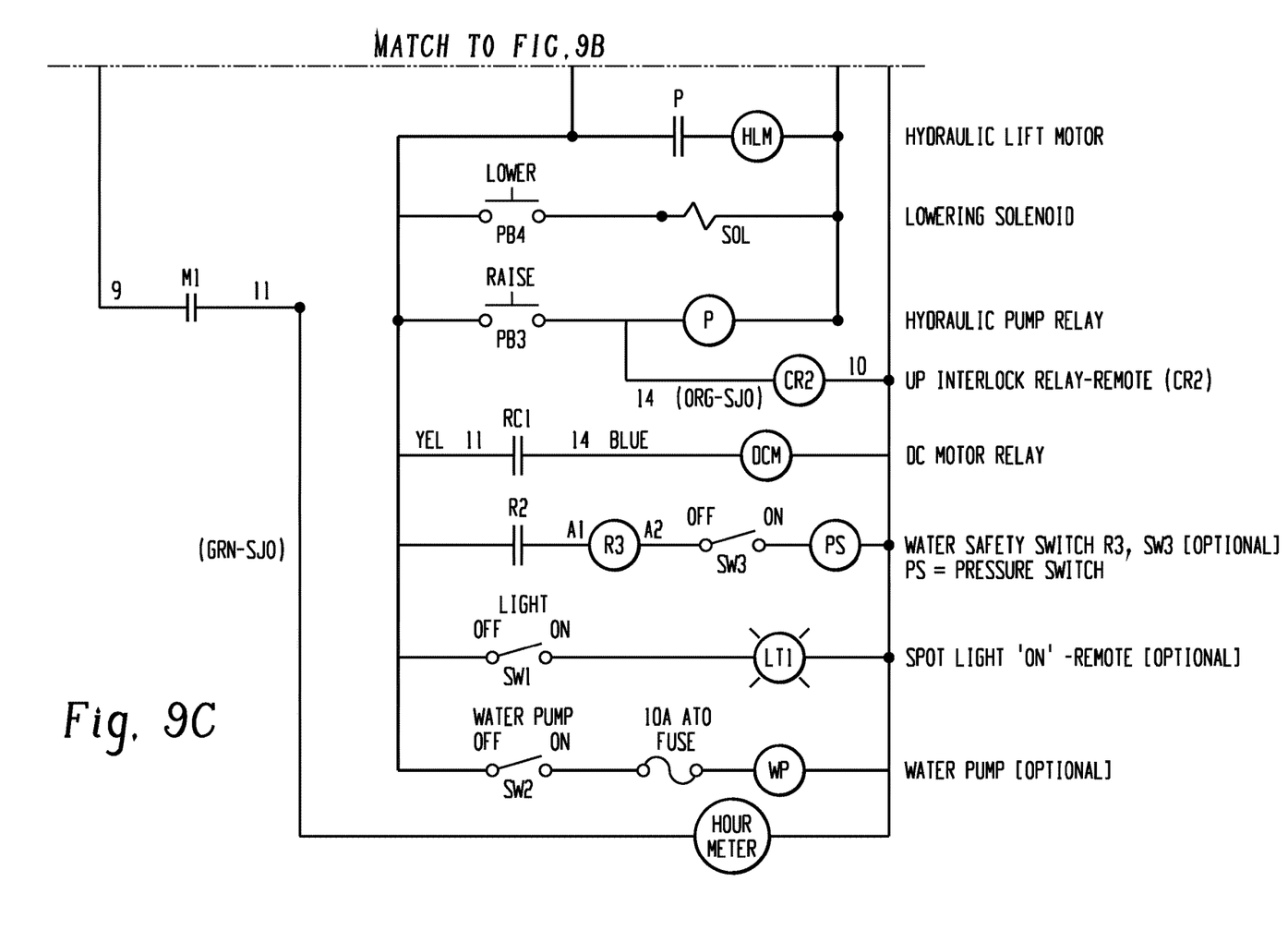

With reference to FIGS. 9A-C, shown are schematic wiring diagrams for saw 10 in accordance with certain embodiments of the present invention. In addition, attached is a Second Wiring Diagram that also forms part of the specification of this application.

It will be appreciated that variations of the above-disclosed features and functions, or alternatives thereof, and other features and functions may be desirably combined into many other different systems or applications. Also that various presently unforeseen or unanticipated alternatives, modifications, variations or improvements therein may be subsequently made by those skilled in the art which are also intended to be encompassed by the following claims.

Many other benefits will no doubt become apparent from future application and development of this technology.

What is claimed is:

1. A self-powered electric concrete saw comprising a frame having a front end, a rear end and a longitudinal length extending between the front and rear ends; a saw blade that is rotatably mounted relative to the frame and configured to be driven; at least one rear wheel and at least one front wheel mounted relative to the frame for facilitating movement of the saw and to allow the self-powered electric concrete saw to be maneuvered from one location to another; an axel carrying the saw blade is disposed forward of the at least one front wheel; the at least one rear wheel and the at least one front wheel include at least one drive wheel; a drive system mounted relative to the frame and configured to drive the at least one drive wheel at a desired speed, the drive system being operably connected to the at least one drive wheel; the concrete saw further comprising a first electric motor and a second electric motor wherein the first and second electric motors are operable independent of one another; the first electric motor having a first motor power output and the second electric motor having a second motor power output wherein the first motor power output is greater than the second motor power output; the first electric motor mounted relative to the frame and being operably connected to the saw blade for driving the saw blade about a blade axis; the second electric motor mounted relative to the frame and being operable independent of the first electric motor; the second electric motor being selectively operably connected to the drive system and is operable independent of the rotation of the saw blade; the concrete saw having an internal power source to provide electrical power to the second electric motor to allow for powering the at least one drive wheel to provide powered assistance to an operator to move the saw without a need to connect the saw to an associated external power supply wherein the self-powered electric concrete saw can be maneuvered by the operator from one location to another using the second electric motor and the internal power source without connection to the associated external power supply.

2. The electric concrete saw according to claim 1, further including an external power input, the external power input configured to be selectively connected to the associated external power supply, the external power input powering the first electric motor by way of the associated external power supply when the external power input is connected to the associated external power supply.

3. The electric concrete saw according to claim 2, wherein the first electric motor is an AC motor and the second electric motor is a DC motor, the external power input configured to power the first electric motor with alternating current power when the external power input is connected to the associated external power supply.

4. The electric concrete saw according to claim 3, wherein the external power input is configured to at least one of charge the internal power source and drive the second electric motor when the external power input is connected to the associated external power supply.

5. The electric concrete saw according to claim 1, wherein the first motor power output is in the range of 20 HP to 50 HP and the second motor power output is in the range of ⅓ HP to 3 HP.

6. The electric concrete saw according to claim 1, further including a third electric motor and a hydraulic system, the hydraulic system configured to at least power a lift assembly to adjust a blade cutting depth of the saw blade, the third electric motor being operably connected to the hydraulic system for driving the hydraulic system, the third electric motor operating independent of the first electric motor and operating independent of the rotation of saw blade.

7. The electric concrete saw according to claim 6, wherein the internal power source provides electrical power to the third electric motor.

8. The electric concrete saw according to claim 1, further including a speed regulator operably connected to the second electric motor, the speed regulator controlling an output rotational velocity of the second electric motor and at least partially the desired speed.

9. The electric concrete saw according to claim 1, wherein the drive system includes a transmission, the transmission at least in part controlling the desired speed.

10. The electric concrete saw according to claim 1, wherein the transmission includes a hydraulic transmission.

11. The electric concrete saw according to claim 1, wherein the first electric motor is a three phase AC motor rated from 20 horse power (HP) to 50 HP and the first electric motor operates at a voltage from 300 volts to 500 volts.

12. A self-powered electric concrete saw comprising a frame having a front end, a rear end and a longitudinal length extending between the front and rear ends; a saw blade that is rotatably mounted relative to the frame and configured to be driven; at least one rear wheel and at least one front wheel mounted relative to the frame for facilitating movement of the saw; the at least one rear wheel and the at least one front wheel include at least one drive wheel; a drive system mounted relative to the frame and configured to drive the at least one drive wheel at a desired speed, the drive system being operably connected to the at least one drive wheel; the concrete saw further comprising a first electric motor and a second electric motor wherein the first and second electric motors are operable independent of one another; the first electric motor having a first motor power output and the second electric motor having a second motor power output wherein the first motor power output is greater than the second motor power output; the first electric motor mounted relative to the frame and being operably connected to the saw blade for driving the saw blade about a blade axis; the second electric motor mounted relative to the frame and being operable independent of the first electric motor; the second electric motor being selectively operably connected to the drive system and is operable independent of the rotation of the saw blade; the concrete saw having an internal power source to provide electrical power to the second electric motor to allow for powering the at least one drive wheel and movement of the concrete saw without connection to an external power source, further including a hydraulic system, the hydraulic system configured to at least power a lift assembly to adjust a blade cutting depth of the saw blade, the first electric motor being operably connected to the hydraulic system for driving the hydraulic system.

13. A self-powered electric concrete saw comprising a frame having a front end, a rear end and a longitudinal length extending between the front and rear ends; a saw blade that is rotatably mounted relative to the frame and configured to be driven; at least one rear wheel and at least one front wheel mounted relative to the frame for facilitating movement of the saw; the at least one rear wheel and the at least one front wheel include at least one drive wheel; a drive system mounted relative to the frame and configured to drive the at least one drive wheel at a desired speed, the drive system being operably connected to the at least one drive wheel; the concrete saw further comprising a first electric motor and a second electric motor wherein the first and second electric motors are operable independent of one another; the first electric motor having a first motor power output and the second electric motor having a second motor power output wherein the first motor power output is greater than the second motor power output; the first electric motor mounted relative to the frame and being operably connected to the saw blade for driving the saw blade about a blade axis; the second electric motor mounted relative to the frame and being operable independent of the first electric motor; the second electric motor being selectively operably connected to the drive system and is operable independent of the rotation of the saw blade; the concrete saw having an internal power source to provide electrical power to the second electric motor to allow for powering the at least one drive wheel and movement of the concrete saw without connection to an external power supply, further including an external power input, the external power input configured to be selectively connected to the associated external power supply, the external power input powering the first electric motor by way of the associated external power supply when the external power input is connected to the associated external power supply, wherein the first electric motor is selectively operably connected to the drive system and powers the drive system when the external power input is connected to the associated external power supply, the first electric motor also powering the saw blade when the external power input is connected to the associated external power supply, the second electric motor being disconnected from the drive system when the external power input is connected to the associated external power supply, the first electric motor being disconnected from the drive system when the external power input is disconnected from the associated external power supply wherein the second electric motor powers the drive system.

14. The electric concrete saw according to claim 13, wherein the external power input is configured to charge the internal power source when the external power input is connected to the associated external power supply.

15. A self-powered electric concrete saw comprising a frame having a front end, a rear end and a longitudinal length extending between the front and rear ends; a saw blade that is rotatably mounted relative to the frame and configured to be driven; at least one rear wheel and at least one front wheel mounted relative to the frame for facilitating movement of the saw; the at least one rear wheel and the at least one front wheel include at least one drive wheel; a drive system mounted relative to the frame and configured to drive the at least one drive wheel at a desired speed, the drive system operably connected to the at least one drive wheel; the concrete saw further comprising a first electric motor and a second electric motor wherein the first and second electric motors are operable independent of one another; the first electric motor having a first motor power output and the second electric motor having a second motor power output wherein the first motor power output is greater than the second motor power output; the first electric motor mounted relative to the frame and being operably connected to the saw blade for driving the saw blade about a blade axis and the first motor being selectively operably connected to the drive system; the second electric motor mounted relative to the frame and being operable independent of the first electric motor; the second electric motor being selectively operably connected to the drive system and is operable independent of the rotation of the saw blade; the concrete saw having an external power input, the external power input configured to be selectively connected to an associated external power supply, the external power input powering the first electric motor by way of the associated external power supply when the external power input is connected to the associated external power supply, the concrete saw further including an internal power source, the first electric motor powering the drive system by way of power from the associated external power supply when the external power input is connected to the associated external power supply, the second electric motor powering the drive system by way of power from the internal power source when the external power input is disconnected from the associated external power supply to allow for powering the at least one drive wheel and movement of the concrete when the external power input is disconnected from the associated external power supply.

16. The electric concrete saw according to claim 15, wherein the first electric motor is an AC motor and the second electric motor is a DC motor, the external power input configured to power the first electric motor with alternating current power when the external power input is connected to the associated external power supply.

17. The electric concrete saw according to claim 16, wherein the external power input is configured to at least one of charge the internal power source and drive the second electric motor when the external power input is connected to the associated external power supply.

18. The electric concrete saw according to claim 15, further including a hydraulic system, the hydraulic system configured to at least power a lift assembly to adjust a blade cutting depth of the saw blade, the first electric motor being operably connected to the hydraulic system for driving the hydraulic system.

19. The electric concrete saw according to claim 15, further including a third electric motor and a hydraulic system, the hydraulic system configured to at least power a lift assembly to adjust a blade cutting depth of the saw blade, the third electric motor being operably connected to the hydraulic system for driving the hydraulic system, the third electric motor operating independent of the first electric motor and operating independent of the rotation of saw blade.

20. The electric concrete saw according to claim 19, wherein the internal power source provides electrical power to the third electric motor.

21. The electric concrete saw according to claim 15, further including a speed regulator operably connected to the second electric motor, the speed regulator controlling an output rotational velocity of the second electric motor and at least partially controlling the desired speed.

22. The electric concrete saw according to claim 15, wherein the drive system includes a transmission, the transmission at least in part controlling the desired speed.

23. The electric concrete saw according to claim 22, wherein the transmission includes a hydraulic transmission.

* * * * *